United States Patent
Hoshino et al.

(10) Patent No.: US 7,635,969 B2
(45) Date of Patent: Dec. 22, 2009

(54) POWER SUPPLY UNIT AND PORTABLE DEVICE

(75) Inventors: Taichi Hoshino, Kanagawa (JP); Hiroki Kikuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 312 days.

(21) Appl. No.: 11/718,219

(22) PCT Filed: Oct. 25, 2005
(Under 37 CFR 1.47)

(86) PCT No.: PCT/JP2005/019950
§ 371 (c)(1),
(2), (4) Date: Aug. 31, 2007

(87) PCT Pub. No.: WO2006/049109
PCT Pub. Date: May 11, 2006

(65) Prior Publication Data
US 2009/0108822 A1    Apr. 30, 2009

(30) Foreign Application Priority Data
Nov. 4, 2004    (JP) .............................. 2004-320183

(51) Int. Cl.
*G05F 1/40* (2006.01)
(52) U.S. Cl. ................... 323/277; 323/280; 323/285
(58) Field of Classification Search ......... 323/273–277, 323/279–285
See application file for complete search history.

(56) References Cited

U.S. PATENT DOCUMENTS

| | | | |
|---|---|---|---|
| 5,994,950 A | 11/1999 | Ochi | |
| 6,201,375 B1 * | 3/2001 | Larson et al. | 323/277 |
| 6,204,646 B1 | 3/2001 | Hiramatsu et al. | |
| 6,236,194 B1 | 5/2001 | Manabe et al. | |
| 6,525,596 B2 | 2/2003 | Hosono et al. | |
| 6,608,520 B1 | 8/2003 | Miyazaki | |
| 6,661,279 B2 | 12/2003 | Yabe | |
| RE39,374 E | 11/2006 | Manabe et al. | |

(Continued)

FOREIGN PATENT DOCUMENTS

EP    0949739 A2    10/1999

(Continued)

OTHER PUBLICATIONS

Official communication issued in the International Application No. PCT/JP2005/018400, mailed on Dec. 27, 2005.

(Continued)

*Primary Examiner*—Jessica Han
(74) *Attorney, Agent, or Firm*—Keating & Bennett, LLP (57) ABSTRACT

A power supply unit is adapted to automatically switch its operational mode between a light load mode and a heavy load mode depending on the level of its output current. The unit has a first error amplification circuit for controlling a first output circuit in the heavy load mode, and a second error amplification circuit for controlling the second output circuit in the light load mode. The first and the second output circuits are controllably enabled and disabled in the opposite manner based on the level of the output current. Thus, the unit can operate on a reduced consumption current with an improved transient response when operating in the light load mode.

11 Claims, 6 Drawing Sheets

U.S. PATENT DOCUMENTS

| | | | |
|---|---|---|---|
| 7,379,284 B2 * | 5/2008 | Fukushi et al. | 323/287 |
| 7,498,793 B2 * | 3/2009 | Xu | 323/285 |
| 2001/0022527 A1 | 9/2001 | Hosono et al. | |
| 2009/0039844 A1 * | 2/2009 | Hoshino et al. | 323/273 |
| 2009/0212752 A1 * | 8/2009 | Hoshino et al. | 323/274 |

FOREIGN PATENT DOCUMENTS

| | | |
|---|---|---|
| JP | 62-75725 A | 4/1987 |
| JP | 02-070264 A | 3/1990 |
| JP | 04-040313 U | 4/1992 |
| JP | 07-336999 A | 12/1995 |
| JP | 09-062376 A | 3/1997 |
| JP | 10-150152 A | 6/1998 |
| JP | 10-232721 A | 9/1998 |
| JP | 11-353040 A | 12/1999 |
| JP | 2000-357018 A | 12/2000 |
| JP | 2001-084043 A | 3/2001 |
| JP | 2001-117650 A | 4/2001 |
| JP | 2001-166837 A | 6/2001 |
| JP | 2002-373942 A | 12/2002 |
| JP | 2003-005847 A | 1/2003 |
| JP | 2003-216247 A | 7/2003 |
| JP | 2003-224967 A | 8/2003 |
| WO | 2006/048990 A1 | 5/2006 |
| WO | 2006/049109 A1 | 5/2006 |
| WO | 2006/049110 A1 | 5/2006 |

OTHER PUBLICATIONS

Official communication issued in the International Application No. PCT/JP2005/019950, mailed on Jan. 24, 2006.

Official communication issued in the International Application No. PCT/JP2005/019954, mailed on Jan. 24, 2006.

Taichi Hoshino et al.; "Power Supply Unit and Portable Device"; U.S. Appl. No. 11/718,223; filed Apr. 27, 2007.

Taichi Hoshino et al.; "Power Supply Unit and Portable Device"; U.S. Appl. No. 11/718,220; filed Apr. 27, 2007.

* cited by examiner

POWER SUPPLY UNIT AND PORTABLE DEVICE

BACKGROUND OF THE INVENTION

1. Field of the Invention

The invention relates to an electric power supply unit for providing a predetermined output voltage obtained by converting the power supply voltage of a given dc power supply such as a battery, and to a portable device equipped with such power supply unit.

2. Description of the Related Art

A power supply unit such as a series regulator converts the power supply voltage of a dc power supply to a predetermined output voltage. This type of power unit must be capable of stably supplying the output voltage to a load without being affected by the fluctuations in the load and/or the power supply voltage. Therefore, in order to improve the transient response of the power supply unit in the process of controlling its output voltage, the power supply unit is mostly provided with a voltage control section, which, however, consumes much current.

If a power supply unit, equipped with such a voltage control section that consumes a large current as stated above, is applied to a portable device, e.g. a mobile telephone, adapted to operate not only in an active mode (or heavy load mode) but also in a sleep mode (or light load mode, e.g. standby mode), the amount of wasteful current consumed in the voltage control section in the sleep mode is not negligibly small.

To circumvent this problem, the power supply unit may be provided with a high-speed stable voltage supply section having an operational amplifier that consumes a large current, and a low-speed stable voltage supply section having an operational amplifier that consumes a small current, as disclosed in Japanese Patent Application Laid Open No. 2001-117650 (referred to as Patent Document 1). The output terminals of these operational amplifiers are connected to the gate of a common large-current output transistor via switching means such that the high-speed stable voltage supply section is exclusively enabled in the active mode, while the low-speed stable voltage supply section is exclusively enabled in the sleep mode. In the event of switching the operational mode of the power supply unit from one mode to the other, a common time interval is set up in which both the high-speed stable voltage supply section and the low-speed stable-voltage supply section are simultaneously turned on, thereby controlling the amount of the current consumed in the enabled stable-voltage supply section, according to the condition of the load.

However, it is necessary for the power supply unit of the Patent Document 1 to acquire an external mode signal for switching the operational mode, but some of portable devices powered by a portable power supply unit are not supported for such mode signal. In those cases, desired switching of the mode cannot be obtained. In addition, the prior art power supply unit requires an external controller for controlling the mode signal in accordance with the condition of the load.

A further problem exists in the prior art power supply unit in that both the high-speed stable voltage supply section and low-speed stable voltage supply section are controlled by a common output transistor and hence that the unit has a poor transient response when the common output transistor is controlled by the slow stable-voltage supply section.

SUMMARY OF THE INVENTION

It is, therefore, an object of the present invention to provide a power supply unit having a light load mode and a heavy load mode that can be switched over therebetween in accordance with the level of the output current, so that the unit can operate on a reduced consumption current with an improved transient response in the light load mode. It is another object of the invention to provide a portable device that is equipped with such power supply unit.

A power supply unit in accordance with one aspect of the invention comprises a first output circuit 10F having capability of supplying output current of a first level and of outputting a predetermined output voltage Vout obtained by regulating a given power supply voltage Vcc; a second output 10S circuit having capability of supplying output current of a second level less than the first current level and of outputting the predetermined output voltage obtained by regulating the power supply voltage; a reference voltage generation circuit 30 arranged to generate a single reference voltage Vref of a predetermined level; a first error amplification circuit 20F adapted to be controllably enabled or disabled based on a mode control signal MOD and compare a feedback voltage Vfb associated with the output voltage with the reference voltage Vref to thereby control the first output circuit 10F such that the feedback voltage is brought to the reference voltage; a second error amplification circuit 20S adapted to be controllably enabled or disabled in the opposite manner with respect to the first error amplification circuit 20F based on the mode control signal MOD and compare the feedback voltage Vfb with the reference voltage Vref to thereby control the second output circuit 10S such that the feedback voltage is brought to the reference voltage, the second error amplification circuit operable with less consumption current than the first error amplification circuit 20F; a current detection circuit arranged to detect a detection signal associated with the output current Io outputted from the first output circuit 10F and second output circuit 10S; and a mode control signal generation circuit 44, 45, and 46 arranged to generate a current level comparison signal COMP in accord with the predetermined level of the detection signal and, based on the current level comparison signal COMP, generating the mode control signal MOD adapted to switch between the operational mode of the first error amplification circuit 20F and the operational mode of the second error amplification circuit 20S, all of the circuits formed in an IC chip, the current detection circuit including: a first detection current transistor circuit 41F controlled by a first control signal issued from the first error amplification circuit 20F, the first detection current transistor circuit adapted to flow therethrough a first detection current that is α times the output current outputted from the first output circuit 10F, the ratio α being a first predetermined ratio; a second detection current transistor circuit 41S controlled by a second control signal issued from the second error amplification circuit 20S, the second detection current transistor circuit adapted to flow therethrough a second detection current that is β times the output current outputted from the second output circuit 10S, the ratio β being a second predetermined ratio smaller than the ratio α; and a detection signal output circuit (e.g. resistors) adapted to flow therethrough the first and second detection currents and output the detection signal, the mode control signal generation circuit adapted to generate, on the basis of the detection signal, the current level comparison signal that has a hysteresis over a region of the output current.

A power supply unit in accordance with another aspect of the invention comprises: a first output circuit 10F having capability of supplying output current of a first level and of outputting a predetermined output voltage Vout obtained by regulating a given power supply voltage Vcc; a second output circuit 10S having capability of supplying output current of a second level less than the first current level and of outputting the predetermined output voltage obtained by regulating the power supply voltage; a reference voltage generation circuit 30 arranged to generate a single reference voltage Vref of a predetermined level; a first error amplification circuit 20F adapted to be controllably enabled or disabled based on a mode control signal MOD and compare a feedback voltage Vfb associated with the output voltage with the reference voltage Vref to thereby control the first output circuit 10F such that the feedback voltage is brought to the reference voltage; a second error amplification circuit 20S operable with less consumption current than the first error amplification circuit 20F and adapted to compare the feedback voltage Vfb with the reference voltage Vref to thereby control the second output circuit 10S such that the feedback voltage is brought to the reference voltage when the first error amplification circuit 20F is disabled based on the mode control signal MOD, and further adapted to control the second output circuit 10S to output a low output voltage lower than the output voltage by a predetermined voltage when the first error amplification circuit 20F is enabled based on the mode control signal; a current detection circuit arranged to detect a detection signal associated with the output current Io outputted from the first output circuit 10F and second output circuit 10S; and a mode control signal generation circuit 44, 45, and 46 arranged to generate a current level comparison signal COMP in accord with the predetermined level of the detection signal and, based on the current level comparison signal COMP, generating the mode control signal MOD adapted to switch between the operational mode of the first error amplification circuit 20F and the operational mode of the second error amplification circuit, 20S all of the circuits formed in an IC chip.

The second error amplification circuit 20S may be provided with an offset voltage for substantially lowering the reference voltage Vref in accordance with the mode control signal MOD so that the second error amplification circuit can deal with the low output voltage.

The mode control signal generation circuit may have a delay circuit 46 adapted to promptly change the mode control signal when the current level comparison signal exhibits a change in the output current Io from a low level to a high level, but, when the current level comparison signal exhibits a change in the output current Io from a high level to a low level, change the mode control signal with a delay by a predetermined delay time T with respect to that change in the current level comparison signal.

The current detection circuit may include: a first detection current transistor circuit 41F controlled by a first control signal issued from the first error amplification circuit 20F, the first detection current transistor circuit adapted to flow therethrough a first detection current that is $\alpha$ times the output current outputted from the first output circuit 10F, the ratio $\alpha$ being a first predetermined ratio; a second detection current transistor circuit 41S controlled by a second control signal issued from the second error amplification circuit 20S, the second detection current transistor circuit adapted to flow therethrough a second detection current that is $\beta$ times the output current outputted from the second output circuit 10S, the ratio $\beta$ being a second predetermined ratio smaller than the ratio $\alpha$; and a detection signal output circuit adapted to flow therethrough the first and second detection currents to output the detection signal, the mode control signal generation circuit adapted to generate, on the basis of the detection signal, the current level comparison signal that is hysteretic over a region of the output current.

The reference voltage generation circuit may be operated on the voltage of an externally supplied operation command signal.

A portable device in accordance with the invention comprises any one of the above described inventive power supply units, a battery arranged to supply the power supply unit with the power supply voltage, a controller arranged to generate an operation command signal for enabling/disabling the power supply unit, and a load receiving the power supply voltage.

As described above, a power supply unit in accordance with the present invention is provided with a first error amplification circuit 20F for controlling a first output circuit 10F capable of supplying current of a first level necessary for a heavy load, and with a second error amplification circuit 20S for controlling a second output circuit 10S capable of supplying current of a second level (less than the first current level) necessary for a light load. These first error amplification circuit 20F and second error amplification circuit 20S are enabled or disabled in the opposite way based on the mode control signal MOD formed on the basis of the level of the output current Io.

Thus, during idling and intermittent operations (i.e. in the light load mode operation), the first error amplification circuit 20F that consumes a large current is disabled, and only the second error amplification circuit 20S that consumes a little current is enabled, thereby then reducing the consumption current of the power supply unit. On the other hand, when operating with a heavy load (i.e. in the heavy load mode operation), the first error amplification circuit 20F is enabled to operate the first output circuit 10F at a high speed.

It is noted that in the light load mode, the small-size transistorized second output circuit 10S (consuming a small current) is controlled by the second error amplification circuit 20S with a small consumption current. Thus, in controlling the output voltage, the power supply unit can operate with a small consumption current without losing its transient response to a change in the output voltage.

It is also noted that no external control signal is necessary in the switching between the heavy load mode and the light load mode, since the switching is performed by internally detecting the level of its own output current. Therefore, in controlling the switching of the operational mode, no difficulty arises for the portable device utilizing the inventive power supply unit if no mode signal is available. Moreover, since the power supply unit requires no external terminals for controlling the switching, the size of the IC chip incorporating the unit can be reduced accordingly.

It will be appreciated that in the present invention, instead of disabling the second error amplification circuit 20S in the heavy load mode, the second error amplification circuit 20S is controlled to cause the second output circuit 10S to provide an output voltage lower than that of the first output circuit 10F by a predetermined voltage. This can be implemented by a simple circuit adapted to merely provide an offset voltage of the second error amplification circuit for substantially lowering the reference voltage Vref in response to, for example, a mode control signal MOD. Then, in the event of switching from the heavy load mode to the light load mode, the second output circuit 10S can provide a predetermined output voltage faster than that of the first embodiment. Incidentally, an increase of the consumption current of the second error amplification circuit 20S in the heavy load mode due to this simple circuit matters little, since the consumption current of the first error amplification circuit 20F is already large in the heavy load mode.

Further, when the state of the current level comparison signal COMP has changed from one indicative of the low level of the output current to the other indicative of the high level of the output current Io, the mode control signal MOD is changed immediately in response to the change. On the other hand, when the state of the current level comparison signal has changed from the one indicative of the high level of the output current Io to the other indicative of the low level of the output current, the mode control signal is changed in response to that change with a delay of a predetermined delay time τ. Thus, together with the reduction in size of the output transistor of the second output circuit in accord with the reduced level of the output current in the light load mode, this delay ensures not only fast transient response of the power supply unit during a switching of mode but also stable switching (chattering-free switching) of the output circuits.

It will be recalled that the mode control signal generation circuit of the invention generates a current level comparison signal exhibiting a hysteresis that depends on the output current. One way to realize such a hysteresis characteristic as described above is to provide a comparison circuit capable of generating a current level comparison signal COMP that exhibits a hysteresis over a predetermined range of the detection signal. Another way is to provide: a first detection current transistor circuit 41F that is controlled by a first control signal outputted from the first error amplification circuit 20F and is adapted to flow therethrough a first detection current that is α times the output current outputted from the first output circuit 10F, where α is a first predetermined ratio; and a second detection current transistor circuit 41S that is controlled by a second control signal outputted from the second error amplification circuit 20S and is adapted to flow therethrough a second detection current that is β times the output current outputted from the second output circuit 10S, where β is a second predetermined ratio smaller than α (α>β). This arrangement allows generation of a current level comparison signal that exhibits a hysteresis that depends on the level of the detection signal associated with the output current, and hence exhibits a hysteresis over a region of the output current.

It should be appreciated that, particularly in the second way, the hysteresis of the current level comparison signal can be realized by casting the first and second current detection transistor circuits 41F and 41S into a current mirror circuit having a predetermined current mirror ratio. This can be attained by simply allowing these transistor circuits to have different ratios in size to the respective first and second output circuits 10F and 10S.

DETAILED DESCRIPTION OF PREFERRED EMBODIMENTS

A power supply unit and a portable device in accordance with the present invention will now be described in detail by way of example with reference to the accompanying drawings. Incidentally, the inventive power supply unit may be referred to as a semiconductor device, since it is fabricated in a transistorized LSI.

Figure 1:
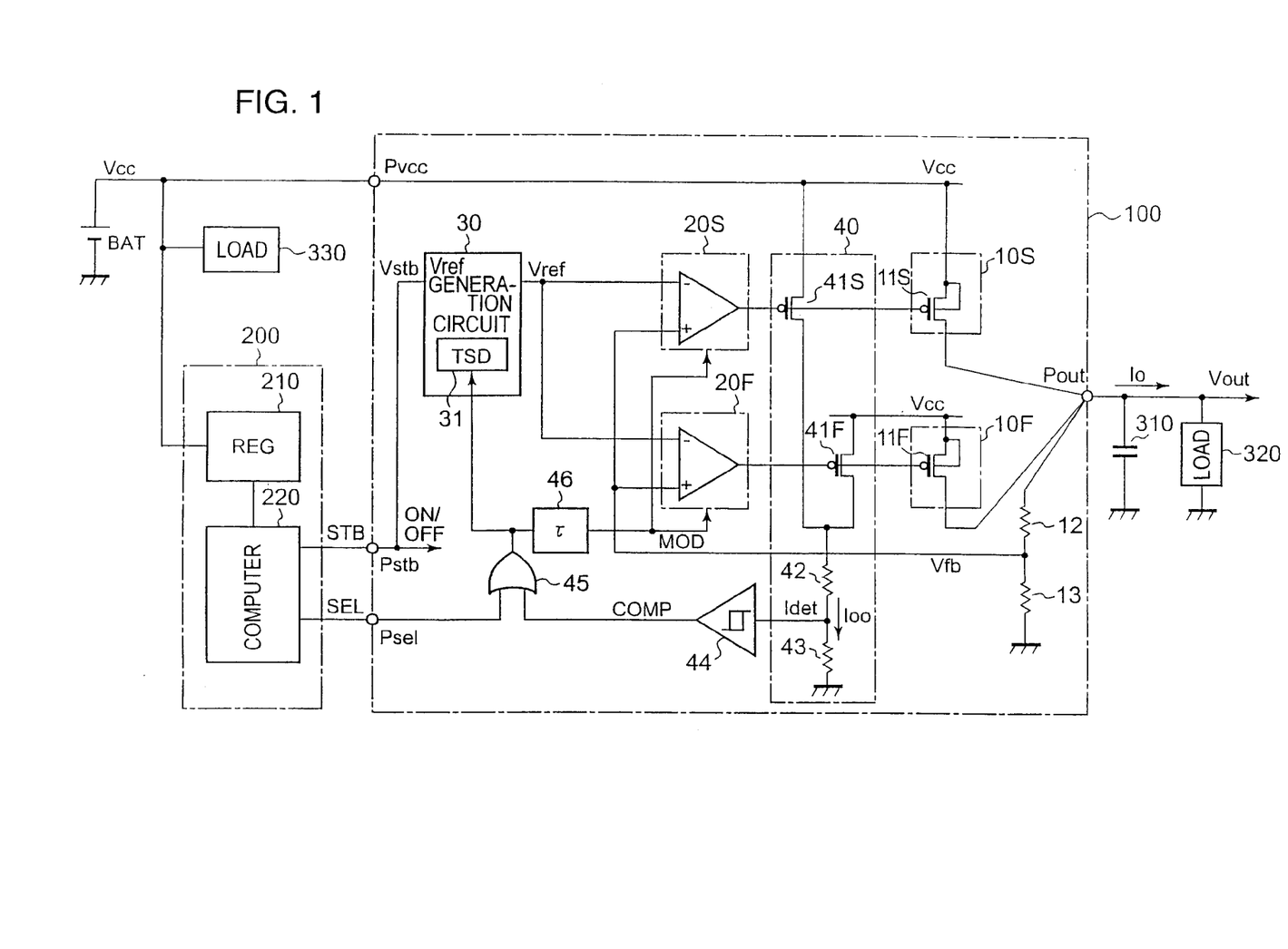
FIG. 1 is a diagram showing an arrangement of a power supply unit in accordance with a first embodiment of the invention, along with the arrangement of a portable device utilizing the power supply unit.

Referring to FIG. 1, there is shown an arrangement of a power supply unit 100 in accordance with a first embodiment of the invention, along with an arrangement of a portable device utilizing the power supply unit.

As shown in FIG. 1, a battery BAT provides a power supply voltage Vcc. The level of the power supply voltage Vcc varies with the charging and discharging conditions of the battery BAT. The power supply voltage Vcc contains ripple components or ripples associated with variations of the load connected thereto.

The power supply voltage Vcc is supplied to the power supply unit 100 via a power supply voltage input terminal Pvcc. The power supply unit 100 has a first output circuit 10F and a second output circuit 10S.

The first output circuit 10F has a current supply capacity for supplying current of a first current level that is sufficient to meet the total load current required by the load connected to the power supply unit 100, and outputs a predetermined output voltage Vout obtained by regulating the power supply voltage Vcc. The first output circuit 10F is a series regulator that includes a first output transistor 11F. The first output transistor 11F can be a P-type MOS transistor.

The second output circuit 10S has a capacity for supplying current of a second current level (less than the first current level) to the load. The level of the second output current is sufficient for the load in idling operation or in intermittent operation (the then load referred to as light load). The second output circuit 10S provides a predetermined output voltage Vout by regulating the power supply voltage Vcc. The second output circuit 10S is a series regulator that includes the second output transistor 11S. Although the second output transistor 11S can also be a P-type MOS transistor, it is presumably much smaller in size than the first output transistor 11F, though the size is enough to supply a required load current to a light load.

Although each of the first and the second output circuits 10F and 10S, respectively, is shown to be a series regulator in FIG. 1, it not limited to this example. For example, it can be a switching type transistor output circuit.

The output voltage Vout is supplied from the power supply unit 100 to a smoothing capacitor 310 and the load 320 via the output terminal Pvout of the power supply unit 100. Symbol Io represents the output current. The output voltage Vout is divided by voltage dividing resistors 12 and 13 to generate a feedback voltage Vfb.

The power supply unit 100 has a first error amplification circuit 20F for controlling the first output circuit 10F by a first control signal and a second error amplification circuit 20S for controlling the second output circuit 10S by a second control signal.

The first error amplification circuit 20F compares the feedback voltage Vfb associated with the output voltage Vout with a reference voltage Vref to control the first output circuit 10F such that the feedback voltage Vfb is brought to the reference voltage Vref. The first error amplification circuit 20F is made operable on a relatively large current. Accordingly, this circuit can control the first output circuit 10F at a high speed in spite of the fact that the first output circuit 10F has a large current supply capacity. Therefore, the first output circuit 10F consumes a large current.

The first error amplification circuit 20F is controlled to be enabled or disabled based on a mode control signal MOD. In the example shown herein, the first error amplification circuit 20F is enabled when the mode control signal MOD has a high (H) level, and is disabled when the mode control signal MOD has a low (L) level.

The second error amplification circuit 20S compares the feedback voltage Vfb associated with the output voltage Vout with the reference voltage Vref to control the second output circuit 10S such that the feedback voltage Vfb is brought to the reference voltage Vref. The second error amplification circuit 20S is made operable on a small current, since it suffices to control the second output circuit 10S having a small current supply capacity. Thus, the second error amplification circuit 20S only consumes a small current as compared with the first error amplification circuit 20F.

It is noted that in controlling the output power, the second error amplification circuit 20S and the second output circuit 10S have fairly good transient response, since the size of the second output transistor 11S of the second output circuit 10S is appropriately reduced in accordance with the reduced nominal current supply capacity of the circuits. Thus, they can also perform output voltage control at a high speed.

The second error amplification circuit 20S is enabled or disabled based on the mode control signal MOD. In the example shown herein, the second error amplification circuit 20S is enabled when the mode control signal MOD has L level, and disabled when the mode control signal MOD has H level. That is, the second error amplification circuit 20S is enabled and disabled in just the opposite way as compared with the first error amplification circuit 20F.

Upon receipt of an operation command signal STB in the form of an operation command voltage Vstb having H level, a reference voltage generation circuit 30 generates the reference voltage Vref having a predetermined level. The reference voltage generation circuit 30 is preferably formed of a band gap type constant voltage circuit to make the reference voltage Vref outputted from the circuit stable as much as possible. The operation command voltage Vstb is supplied from a controller 200, so that the voltage is stable. As a consequence, the reference voltage generation circuit 30 can provide the reference voltage Vref with little ripples even when ripples are contained in the power supply voltage Vcc. Therefore, the output voltage of the power supply unit 100 is stable.

In addition, the reference voltage generation circuit 30 has a thermal shutdown circuit (TSD) 31, which has a temperature monitor for monitoring the temperature inside the power supply unit 100 and for stopping the power supply unit 100 for protection of the unit against the temperature thereof reaching a predetermined upper permissible temperature. Since this monitoring is needed for overheat protection only in the heavy load mode, it is stopped in the light load mode, thereby cutting down current consumption of the reference voltage generation circuit 30.

A current detection circuit 40 detects the detection signal Idet outputted from the first output circuit 10F and the second output circuit 10S on the basis of the output current Io. The current detection circuit 40 has a first P-MOS type transistor (referred to as first current detection transistor) 41F having a gate that receives the same first control signal as the first output transistor 11F, a second P-MOS type transistor (referred to as second current detection transistor) 41S having a gate that receives the same second control signal as the second output transistor 11S, and resistors 42 and 43 (together serving as a detection signal output circuit) for passing through them a detection current Ioo coming from the first and second current detection transistors 41F and 41S, respectively, and generates a detection signal Idet having a voltage level in accord with the level of the detection current Ioo.

A comparison circuit 44 compares the detection signal Idet with a reference voltage to generate a current level comparison signal COMP. To prevent the current level comparison signal COMP from chattering, the comparison circuit 44 preferably has a hysteresis characteristic. For example, the level of the reference voltage is set such that the current level comparison signal COMP has H level in the heavy load mode, but L level in the light load mode.

The current level comparison signal COMP is fed to a delay circuit 46 via an OR circuit 45. The delay circuit 46 promptly pulls up the mode control signal MOD from a low (L) level (indicating the light load mode) to a high (H) level (indicating the heavy load mode) when the current level comparison signal COMP changes from L level indicative of the output current Io being at a low level to H level indicative of the output current Io being at a high level.

On the other hand, when the current level comparison signal COMP changes from H level to L level, the delay circuit 46 pulls down the mode control signal MOD from H level (indicating heavy load mode) to L level (indicating light load mode) with a delay of a predetermined delay time $\tau$ in response to the change in current level comparison signal COMP.

This delay, together with the size reduction of the second output transistor 11S of the second output circuit 10S in accord with the reduced level of the output current in the light load mode, ensures fast transient response and stable switching (chattering-free switching) of the output circuit in the mode switching operation.

An operation command signal (i.e. standby signal) STB for controllably enabling or disabling the power supply unit 100 is fed as an ON/OFF signal to the power supply unit 100 via an operation command signal input terminal Pstb. Thus, the operation command signal STB may be referred to as standby signal. When the power supply unit 100 is disabled, the output voltage Vout and the output current Io of the power supply unit 100 are zero, and its internal consumption current is zero or reduced to an extremely small minimum level.

The operation command signal STB has either a high (H) level or a low (L) level. The power supply unit 100 is enabled when the operation command signal STB has H level, and disabled when the signal has L level. When the power supply unit is to be disabled, power supply to the respective components of the unit 100 including the first error amplification circuit 20F, second error amplification circuit 20S, reference voltage generation circuit 30, and comparison circuit 44, is shut down.

The operation command signal STB is supplied from the controller 200. The operation command signal STB at H level has the operation command voltage Vstb in the range of, for example, 1.5-3 V, and, at L level, has zero Volt. This operation command voltage Vstb is supplied to the reference voltage generation circuit 30 as the operating voltage thereof.

The controller 200 includes a computer 220 for controlling the respective components of the portable device. The controller 200 includes a voltage adjustment circuit (or regulator)

210 for regulating the power supply voltage Vcc to the voltage required by the computer 220. It is noted that if the power supply voltage Vcc contains ripples, the computer 220 is supplied with a stable voltage having only suppressed ripples. Incidentally, a motion control signal SEL may be supplied from the computer 220 to the power supply unit 100 via the motion control terminal Psel of the unit 100. The motion control signal SEL and the current level comparison signal COMP are inputted into an OR circuit 45.

Although it has been described above that the operational mode is automatically switched between the light load mode and the heavy load mode by detecting the level of the output current Io, a modification can be made to allow the mode to be switched by the motion control signal SEL as needed.

Since the computer 220 is operated by a stabilized voltage, the operation command voltage Vstb of the operation command signal STB contains little ripples and also is stable.

The power supply voltage Vcc is supplied to various internal loads of the portable device collectively represented by a load block 330.

Referring also to the timing diagram of FIG. 2, operations of the power supply unit 100 and the portable device of FIG. 1 will now be described.

Figure 2:
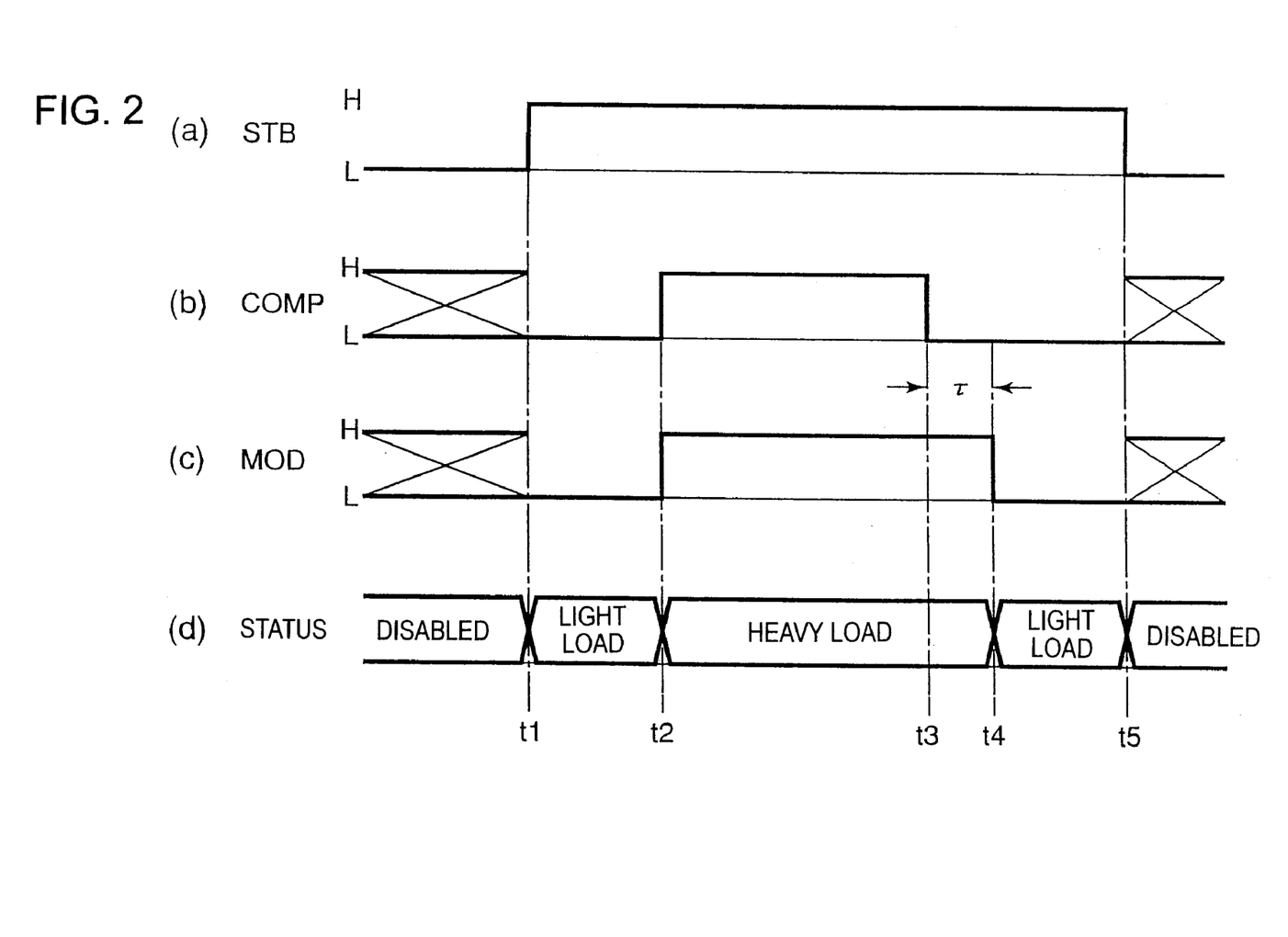
FIG. 2 is a timing diagram illustrating operation of the power supply unit of FIG. 1.

As shown in FIG. 2, up to time t1, the operation command signal STB has L level, so that the power supply unit 100 is in the disabled state. Since the power to the first error amplification circuit 20F, second error amplification circuit 20S, reference voltage generation circuit 30, and comparison circuit 44 is shut down under this condition, the current level comparison signal COMP and the mode control signal MOD are indeterminate.

As the operation command signal STB us pulled up to H level at time t1, the power supply unit 100 is enabled. Accordingly, the power supply voltage is supplied to the respective first error amplification circuit 20F, second error amplification circuit 20S, reference voltage generation circuit 30, and comparison circuit 44. Then, the reference voltage Vref is generated.

In the example shown, the power supply unit is put in a light load mode at time t1, thereby subsequently providing a small output current Io. At time t1, the current level comparison signal COMP has L level, and so is the mode control signal MOD outputted from the delay circuit 46, since the power supply unit 100 is in the light load mode.

In the light load mode, the second error amplification circuit 20S is enabled, causing the second output circuit 10S to be operated by the second control signal. The second output transistor 11S of the second output circuit 10S has an appropriately reduced size to supply a reduced amount of output current to the load. Thus, the second output transistor 11S can respond promptly, i.e. without delay, to the second control signal received from the second error amplification circuit 20S that operates on a small current. Since the second control signal is also supplied to the gate of the second current detection transistor 41S, a detection current Ioo in accord with the output current Io from the second output circuit 10S also flows through the transistor 41S.

This light load mode operation continues until time t2. The light load mode may be referred to as low consumption current mode in the sense that the level of the consumption current of the power supply unit 100 is low.

At time t2, the ascending detection current Ioo reaches a level at which the comparison circuit 44 undergoes a hysteretic inversion, manifesting a hysteretic characteristic of the comparison circuit 44. Thus, at this point the current level comparison signal COMP jumps up to H level, and so does the mode control signal MOD without being influenced by the delay circuit 46. That is, the power supply unit instantly assumes the heavy load mode.

As a result, the second error amplification circuit 20S will be disabled. The first error amplification circuit 20F will be enabled in turn, outputting the first control signal to enable the first output circuit 10F. The first error amplification circuit 20F is made operable on a relatively large current so that it can control the first output circuit 10F at a high speed (i.e. with good transient response to the circuit 10F) in spite of the fact that the first output circuit 10F has a large current supply capacity have fast transient response. Thus, the first output circuit 10F can be controlled without any delay even when it is supplying a large current to a heavy load.

The heavy load mode can be referred to as high-speed operation mode in the sense that the power supply unit 100 can response to a large load at a high speed.

At time t3, the descending detection current Ioo reaches another level at which the comparison circuit 44 undergoes a further hysteretic inversion and correspondingly the current level comparison signal COMP goes down to L level. When the current level comparison signal COMP changes from H level to L level, the delay circuit 46 plays a role as an on-delay timer. Thus, the mode control signal MOD goes down to L level with a delay by a predetermined delay time T.

Over the period of the predetermined delay time $\tau$, the output current Io is reduced to a level in accord with the light load mode. However, since the mode control signal MOD then has H level, the first error amplification circuit 20F is in operation, thereby providing a required output current from the first output circuit 10F. It is noted that, by setting up the predetermined time $\tau$, the first output circuit 10F can continue to provide a large stable output current to the load even when the magnitude of the load varies violently, since the circuit has a large current supply capacity.

At time t4, when the mode control signal MOD goes down to L level, the power supply unit 100 assumes the light load mode, in the same manner as in the period t1-t2. At time t5, when the operation command signal STB goes down to L level, the power supply unit 100 is disabled, as in the period prior to time t1.

In this manner, while the power supply unit is performing idling or intermittent operation in the light load mode, only the second error amplification circuit 20S is enabled, consuming only a small current, and the first error amplification circuit 20F that would otherwise consume a large current is disabled. Thus, the consumption current of the power supply unit is greatly reduced in the light load mode.

It is noted that in the light load mode, the small-size transistorized second output circuit 10S is controlled by the second error amplification circuit 20S with a small consumption current. Thus, in controlling the output voltage in the light load mode, the power supply unit can operate with a small consumption current without losing its transient response to a change in the output voltage.

It is also noted that, since the switching of the operational mode of the power supply unit between the heavy load mode and the light load mode is performed inside the power supply unit 100 based on the detected level of the output current Io, no external control signal therefor is required. Thus, if no mode signal is available to a portable device that utilizes the power supply unit, the switching of the operational mode can be performed without any problem. Further, in fabricating the power supply unit in an IC chip, the number of terminals required for the switching will be reduced accordingly, thereby facilitating minimization of the IC chip.

As described above, when the current level comparison signal COMP changes from L level indicative of the output current Io being at low level to H level indicative of the output current Io being at high level, the mode control signal MOD is promptly changed in response to that change. On the other hand, when the current level comparison signal COMP changes from H level to L level, the mode control signal MOD is delayed to change in response to that change by a predetermined delay time τ. Thus, together with the reduction of the size of the second output transistor 11S of the second output circuit 10S in accord with the reduced level of the output current in the light load mode, this delay ensures fast transient response and stable switching (chattering-free switching) of the output circuit in the mode switching operation.

It will be recalled that little ripples remain in the reference voltage Vref due to the fact that the reference voltage Vref is generated by the reference voltage generation circuit 30 from the ripple-suppressed operation command voltage Vstb. Therefore, even when ripples are contained in the power supply voltage Vcc, they will be extremely reduced in the output voltage Vout. Thus, using the operation command signal STB supplied from the controller 200 as the operating voltage of the reference voltage generation circuit 30, the power supply unit 100 has an improved ripple rejection characteristic.

It will be also recalled that in addition to the original usage of the operation command signal STB as the operation command voltage for enabling and disabling the power supply unit 100, the signal STB is also used as the operating voltage of the reference voltage generation circuit 30. This facilitates reduction of the number of necessary terminals of the transistorized power supply unit.

Figure 3:
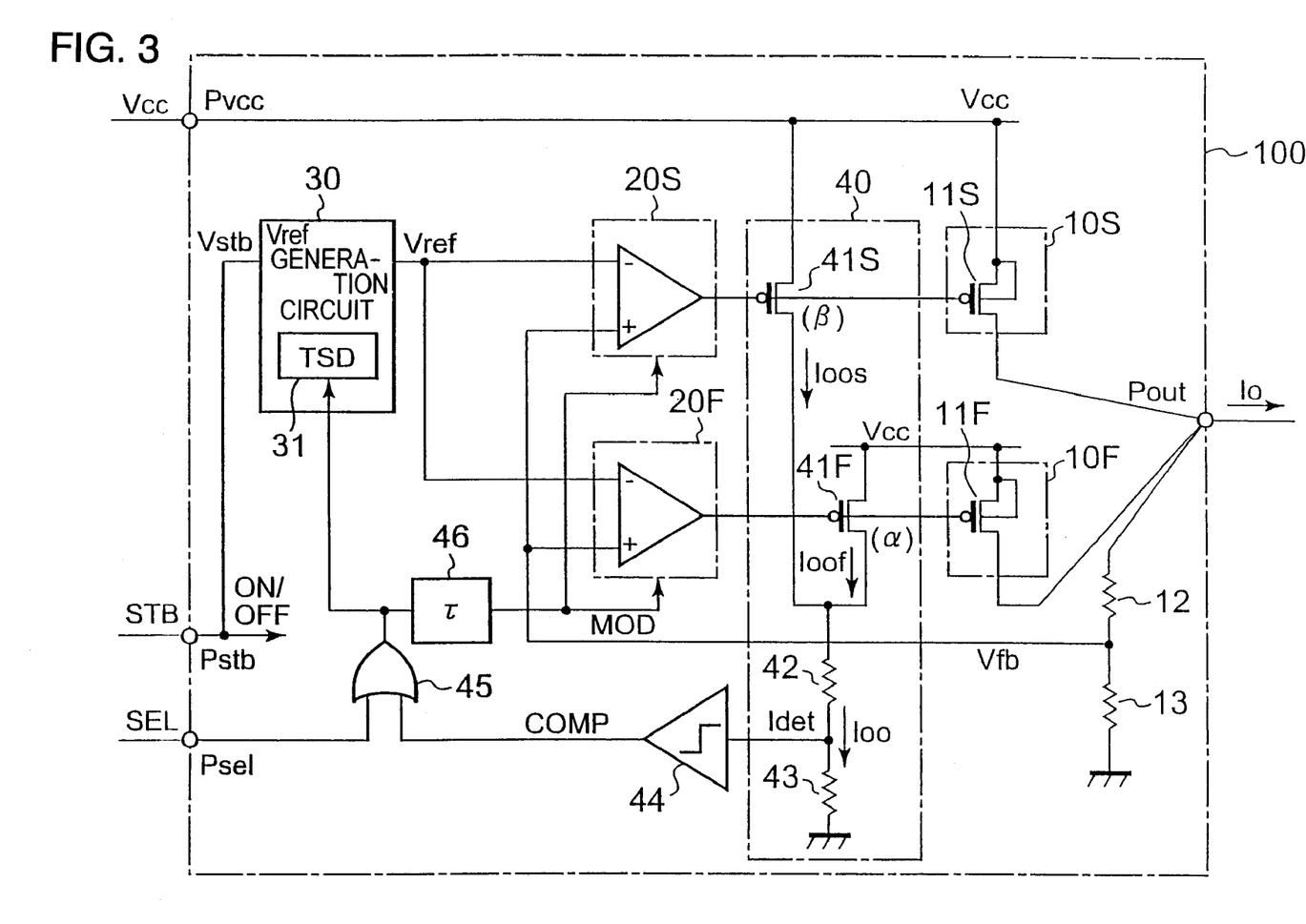
FIG. 3 is a diagram showing an arrangement of a power supply unit in accordance with a second embodiment of the invention.

Referring to FIG. 3, there is shown an arrangement of a power supply unit 100 in accordance with a second embodiment of the invention.

The current level comparison signal COMP of the power supply unit 100 shown in FIG. 3 has a hysteresis characteristic different from that of the unit shown in FIG. 1.

As seen in FIG. 3, the first current detection transistor 41F of the current detection circuit 40 is controlled by the first control signal outputted from the first error amplification circuit 20F. Further, the first current detection transistor 41F is adapted to flow through it a first detection current Ioof that is α times the output current Io outputted from the first output circuit 10F, where α is a first predetermined ratio.

On the other hand, the second current detection transistor 41S is controlled by the second control signal outputted from the second error amplification circuit 20S Further, the second current detection transistor 41S is adapted to flow through it a second detection current Ioos that is β times the output current Io outputted from the second output circuit 10S, where β is a second predetermined ratio smaller than the first predetermined ratio α (α>β).

Thus, for a given magnitude of the output current Io, the detection current Ioo through the resistors 42 and 43 becomes different in magnitude, Ioof and Ioos, respectively in a first case where the current Io is outputted from the first output circuit 10F and in a second case where the current Io is outputted from the second output circuit 10S.

The comparison circuit 44 has no hysteresis characteristic. This implies that it outputs a current level comparison signal COMP at L level whenever the inputted detection signal Idet is less than a predetermined threshold voltage Vth, while it outputs a current level comparison signal COMP of H level whenever the inputted detection signal Idet has reached or exceeded the predetermined threshold voltage Vth.

Figure 4:
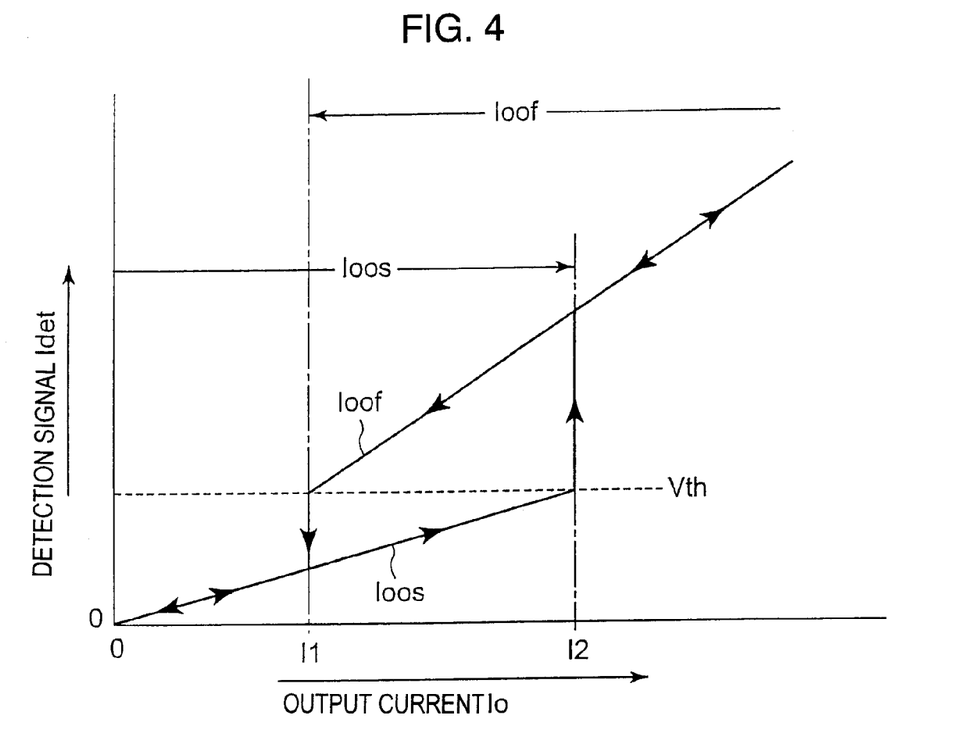
FIG. 4 is a diagram showing the relationship between the output current of the power supply unit and the detection signal associated with the output current.
Figure 5:
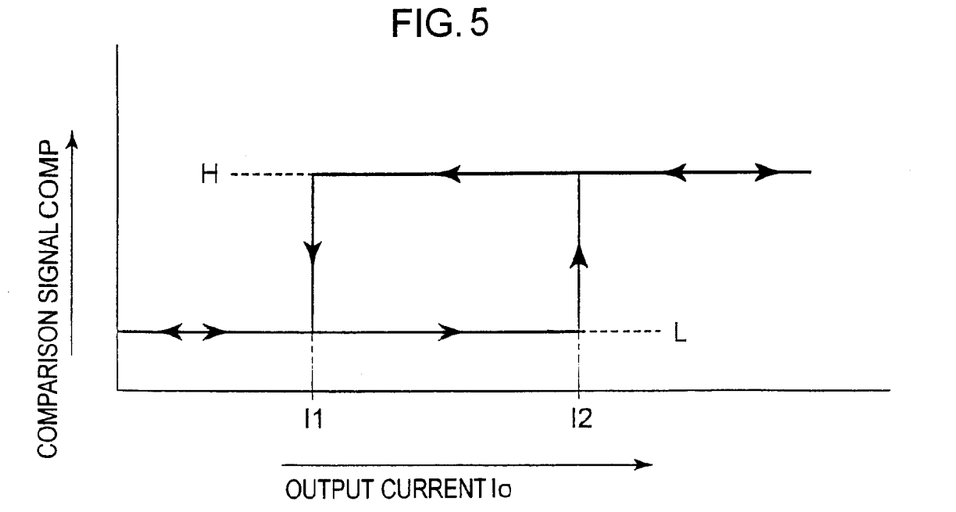
FIG. 5 is a diagram showing the relationship between the output current and the current level comparison signal.

This is depicted in FIGS. 4 and 5. FIG. 4 particularly shows the relationship between the output current Io and the detection signal Idet, and FIG. 5 shows the relationship between the output current Io and the current level comparison signal COMP.

It is seen from FIGS. 4 and 5 that the second detection current Ioos flows over the period in which the output current Io increases from zero to a second predetermined current level I2. During this period, the current level comparison signal COMP is at L level.

When the output current Io has increased to the second predetermined current level I2, the detection signal Idet exceeds the threshold value Vth of the comparison circuit 44, at which the current level comparison signal COMP is pulled up to H level. This in turn disables the second error amplification circuit 20S, and instead enables the first error amplification circuit 20F. As a consequence, a first detection current Ioof begins to flow. Meanwhile, the detection signal Idet increases with a rate given by the ratio α/β of the first ratio α to the second ratio α.

In the event that the output signal Io decreases (from an arbitrary level higher than I1) to the first predetermined current level I1, the detection signal Idet becomes less than the threshold value Vth of the comparison circuit 44. Then, the current level comparison signal COMP will be pulled down to L level. Under this condition, the first error amplification circuit 20F will be disabled and instead the second error amplification circuit 20S will be enabled, causing the second detection current Ioos to flow.

Thus, the current level comparison signal COMP has a hysteresis characteristic, which can be realized by simply casting the first and second current detection transistor circuits 41F and 41S, respectively, into a current mirror circuit each having a predetermined current mirror ratio. This can be done by forming the first and second current detection transistor circuits 41F and 41S, respectively, to have different ratios in size to the corresponding output transistors of the first and second output circuits 10F and 10S, respectively, in accord with the current mirror ratio.

Figure 6:
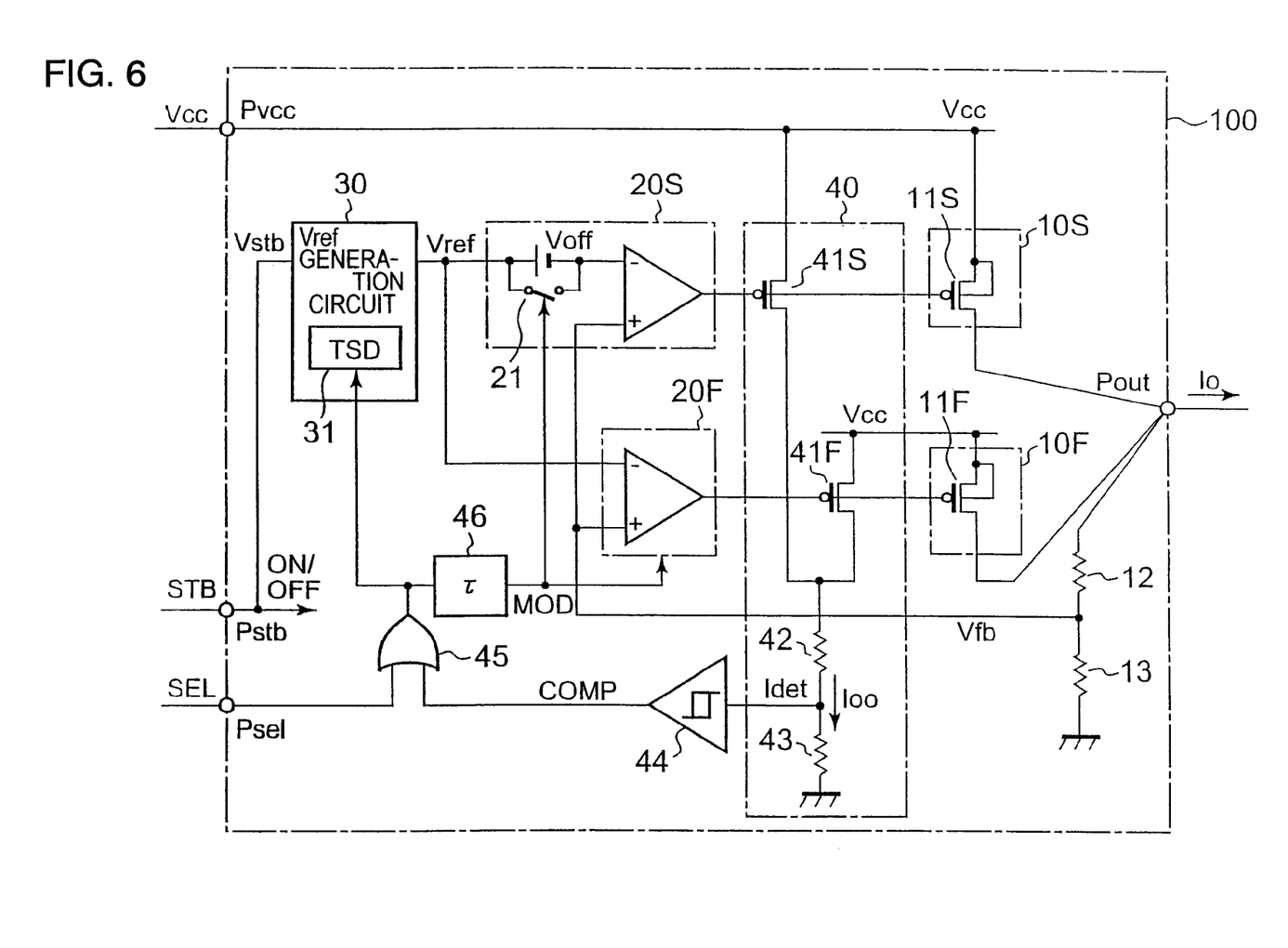
FIG. 6 is a diagram showing an arrangement of a power supply unit in accordance with a third embodiment of the invention.

Referring to FIG. 6, there is shown an arrangement of a power supply unit 100 in accordance with a third embodiment of the invention.

The second error amplification circuit 20S shown in FIG. 6 differs from the second error amplification circuit 20S shown in FIG. 1 in that the former circuit is controlled by the mode control signal MOD in a different way, as described below.

In the arrangement shown in FIG. 6, instead of being disabled in the heavy load mode, the second error amplification circuit 20S is controlled in such a way that the second output circuit 10S provides an output voltage that is lower than the output voltage of the first output circuit 10F by a predetermined voltage.

In operation, the second error amplification circuit 20S of FIG. 6 consumes less current than the first error amplification circuit 20F.

The second error amplification circuit 20S controls the second output circuit 10S to provide therefrom a predetermined output voltage Vout when the mode control signal MOD is at L level to disable the first error amplification circuit 20F. In this case, the second error amplification circuit 20S compares the feedback voltage Vfb with the reference voltage Vref to bring the feedback voltage Vfb to the reference voltage Vref.

On the other hand, when the mode control signal MOD is at H level to enable the first error amplification circuit 20F, the second error amplification circuit 20S controls the second output circuit 10S to output therefrom a voltage that is lower than the predetermined output voltage Vout by a predetermined voltage.

Thus, the power supply unit 100 of FIG. 6 can output the same predetermined voltage Vout as in the first embodiment shown in FIG. 1. It should be noted, however, that the second error amplification circuit 20S and the second output circuit 10S of FIG. 6 collaborate to output said voltage less than the output voltage Vout by the predetermined voltage. As a consequence, the second output circuit 10S can output the predetermined output voltage Vout at the moment when the mode control signal MOD changes to L level, in a much faster way than in the first embodiment.

To do this, the second error amplification circuit 20S is provided with an offset voltage Voff for substantially reducing its reference voltage Vref when the mode control signal MOD has H level so that the second error amplification circuit 20S can then deal with the low output voltage. The offset voltage Voff is removed by a switch 21 when the mode control signal MOD has L level.

Figure 7:
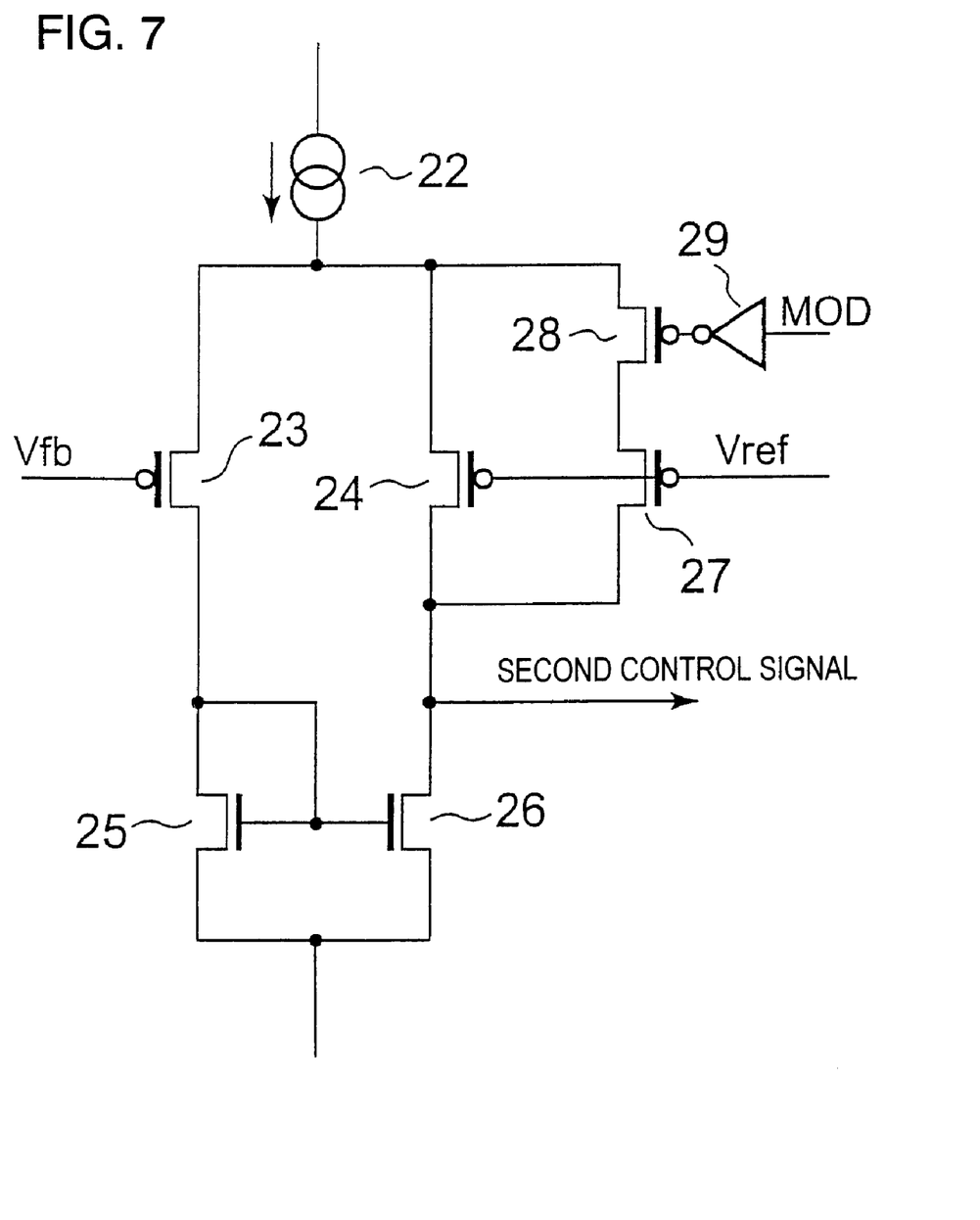
FIG. 7 is a circuit diagram of a second error amplification circuit capable of providing an offset voltage.

Referring to FIG. 7, there is shown a relevant section of an exemplary circuit arrangement capable of providing the second error amplification circuit 20S with the offset voltage Voff.

As shown in FIG. 7, the second error amplification circuit 20S includes a first series circuit of a P-type MOS transistor 23 having a gate receiving the feedback voltage Vfb and an N-type MOS transistor 25 having a drain and a gate coupled together, and a second series circuit of a P-type MOS transistor 24 having a gate receiving the reference voltage Vref and an N type MOS transistor 26 having a gate connected to the gate of an N type MOS transistor 25, with the second series circuits connected in parallel with first series circuit. This parallel circuit is supplied with current from a constant-current generation circuit 22. The second control signal is outputted from the series connection node of the P-type MOS transistor 24 and N type MOS transistor 26.

Connected to the P-type MOS transistor 24 is a series circuit of a P-type MOS transistor 27 having a gate receiving the reference voltage Vref and a P-type MOS transistor 28 having a gate receiving the inverted version of the mode control signal MOS inverted by a NOT circuit 29.

The circuit shown in FIG. 7 provides an offset voltage Voff that substantially reduces the reference voltage Vref for the second error amplification circuit 20S in the heavy load mode introduced by the H level mode control signal MOD.

It is noted that an incremental consumption current of the second error amplification circuit 20S in the heavy load mode does not present a serious problem since the consumption current of the first error amplification circuit 20F is already large.

As described above, the power supply unit of the invention has a first error amplification circuit for controlling a first output circuit during a heavy load mode operation and a second error amplification circuit for controlling the second output circuit during a light load mode operation. The two error amplification circuits operate in such a way that the first and the second output circuits are controllably enabled and disabled in the opposite manner based on the level of the output current. The power supply unit can reduce its consumption current in accord with the level of the output current in the light load mode while maintaining an improved transient response. Thus, it can be effectively applied to a portable device.

The invention claimed is:

1. A power supply unit comprising:
   a first output circuit having capacity of supplying output current of a first level and capable of outputting a predetermined output voltage obtained by regulating a given power supply voltage,
   a second output circuit having capability of supplying output current of a second level less than said first level and of outputting said predetermined output voltage obtained by regulating said power supply voltage;
   a reference voltage generation circuit arranged to generate a single reference voltage of a predetermined level;
   a first error amplification circuit adapted to be controllably enabled or disabled based on a mode control signal and compare a feedback voltage associated with said output voltage with said reference voltage to thereby control said first output circuit such that said feedback voltage is brought to said reference voltage;
   a second error amplification circuit adapted to be controllably enabled or disabled in the opposite manner with respect to said first error amplification circuit based on said mode control signal and compare said feedback voltage with said reference voltage to thereby control said second output circuit such that said feedback voltage is brought to said reference voltage, said second error amplification circuit operable with less consumption current than said first error amplification circuit;
   a current detection circuit arranged to detect a detection signal associated with the output current outputted from said first and second output circuits; and
   a mode control signal generation circuit arranged to generate a current level comparison signal in accord with the predetermined level of said detection signal and, on the basis of said current level comparison signal, generating said mode control signal adapted to switch between the operational mode of said first error amplification circuit and the operational mode of said second error amplification circuit, all of said circuits formed in an IC chip,
   said current detection circuit including:
      a first detection current transistor circuit controlled by a first control signal issued from said first error amplification circuit, said first detection current transistor circuit adapted to flow therethrough a first detection current that has the same magnitude as the output current outputted from said first output circuit multiplied by a first predetermined ratio;
      a second detection current transistor circuit controlled by a second control signal issued from said second error amplification circuit, said second detection current transistor circuit adapted to flow therethrough a second detection current that has the same magnitude as the output current outputted from said second output circuit multiplied by a second predetermined ratio smaller than said first ratio; and
      a detection signal output circuit adapted to flow therethrough said first and second detection currents and output said detection signal,
   said mode control signal generation circuit adapted to generate, on the basis of said detection signal, said current level comparison signal having a hysteresis over a region of said output current.

2. The power supply unit according to claim 1, wherein said mode control signal generation circuit has a delay circuit adapted to promptly change said mode control signal when said current level comparison signal exhibits a change in said output current from a low level to a high level, but, when said current level comparison signal exhibits a change in the output current from a high level to a low level, change said mode control signal with a delay by a predetermined delay time with respect to that change in said current level comparison signal.

3. The power supply unit according to claim 1, wherein said reference voltage generation circuit is operated on the voltage of an externally supplied operation command signal.

4. A portable device, comprising:
a power supply unit according to claim 1;
a battery arranged to supply said power supply unit with said power supply voltage;
a controller arranged to generate an operation command signal for enabling/disabling said power supply unit; and
a load receiving said power supply voltage.

5. A power supply unit comprising:
a first output circuit having capability of supplying output current of a first level and of outputting a predetermined output voltage obtained by regulating a given power supply voltage,
a second output circuit having capability of supplying output current of a second level less than said first current level and of outputting said output voltage obtained by regulating said power supply voltage;
a reference voltage generation circuit arranged to generate a single reference voltage of a predetermined level;
a first error amplification circuit adapted to be controllably enabled or disabled based on a mode control signal and compare a feedback voltage associated with said output voltage with said reference voltage to thereby control said first output circuit such that said feedback voltage is brought to said reference voltage;
a second error amplification circuit operable with less consumption current than said first error amplification circuit and adapted to compare said feedback voltage with said reference voltage to thereby control said second output circuit such that said feedback voltage is brought to said reference voltage when said first error amplification circuit is disabled based on said mode control signal, and further adapted to control said second output circuit to output a low output voltage lower than said output voltage by a predetermined voltage when said first error amplification circuit is enabled based on said mode control signal;
a current detection circuit arranged to detect a detection signal associated with the output current outputted from said first and second output circuits, and
a mode control signal generation circuit arranged to generate a current level comparison signal in accord with the predetermined level of said detection signal and, on the basis of said current level comparison signal, generating said mode control signal adapted to switch between the operational mode of said first error amplification circuit and the operational mode of said second error amplification circuit, all of said circuits formed in an IC chip.

6. The power supply unit according to claim 5, wherein said second error amplification circuit is provided with an offset voltage for substantially lowering said reference voltage in accordance with said mode control signal so that said second error amplification circuit is capable of dealing with said low output voltage.

7. The power supply unit according to claim 6, wherein said mode control signal generation circuit has a delay circuit adapted to promptly change said mode control signal when said current level comparison signal exhibits a change in said output current from a low level to a high level, but change said mode control signal with a delay by a predetermined delay time with respect to a change in said output current from the high level to the low level.

8. The power supply unit according to claim 5, wherein said mode control signal generation circuit has a delay circuit adapted to promptly change said mode control signal when said current level comparison signal exhibits a change in said output current from a low level to a high level, but change said mode control signal with a delay by a predetermined delay time with respect to a change in said output current from the high level to the low level.

9. The power supply unit according to claim 5, wherein said current detection circuit includes:
a first detection current transistor circuit controlled by a first control signal issued from said first error amplification circuit, said first detection current transistor circuit adapted to flow therethrough a first detection current that has the same magnitude as the output current outputted from said first output circuit multiplied by a first predetermined ratio;
a second detection current transistor circuit controlled by a second control signal issued from said second error amplification circuit, said second detection current transistor circuit adapted to flow therethrough a second detection current that has the same magnitude as the output current outputted from said second output circuit multiplied by a second ratio smaller than said first ratio; and
a detection signal output circuit adapted to flow therethrough said first and second detection currents and output said detection signal,
said mode control signal generation circuit adapted to generate, on the basis of said detection signal, said current level comparison signal having a hysteresis over a region of said output current.

10. The power supply unit according to claim 5, wherein said reference voltage generation circuit is operated on the voltage of an externally supplied operation command signal.

11. A portable device, comprising:
a power supply unit according to claim 5;
a battery arranged to supply said power supply unit with said power supply voltage;
a controller arranged to generate an operation command signal for enabling/disabling said power supply unit; and
a load receiving said power supply voltage.

* * * * *